July 23, 1935. H. M. STEPHENSON 2,009,099
VARIABLE SPEED TRANSMISSION
Filed April 10, 1934
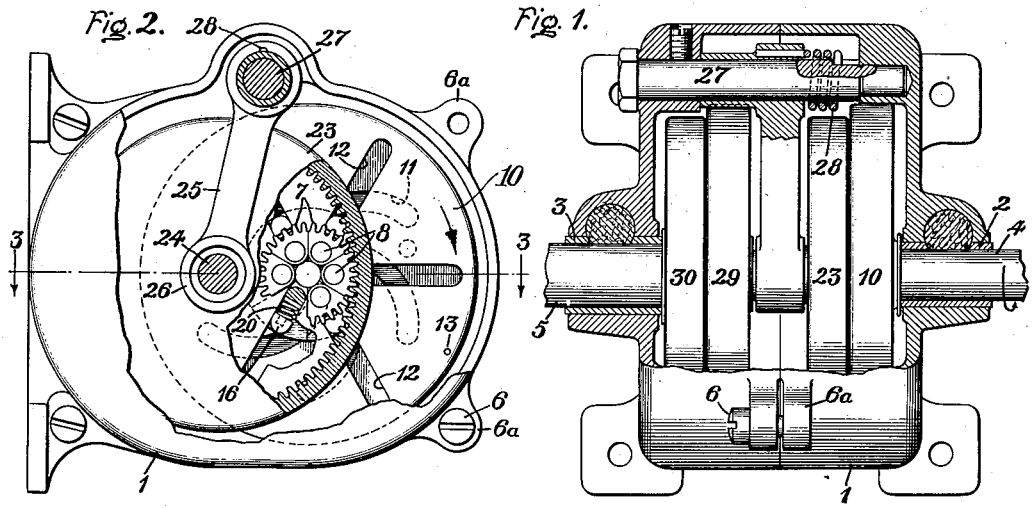
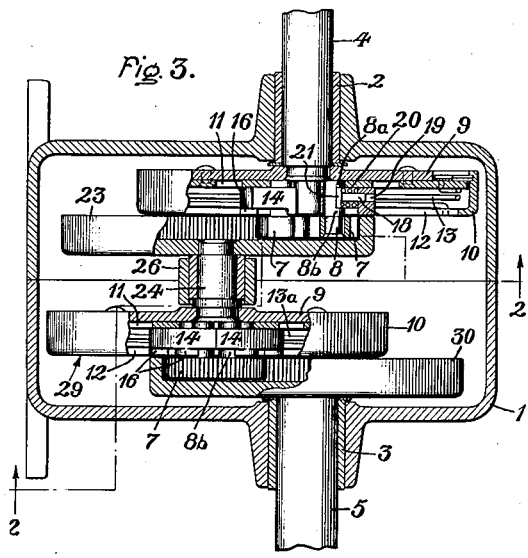
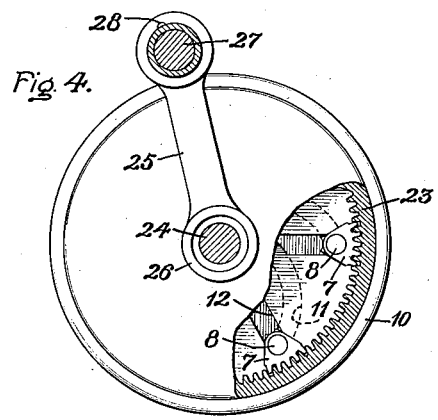
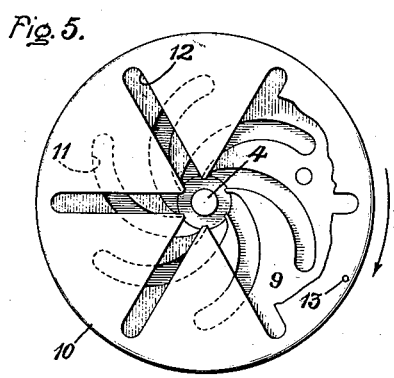
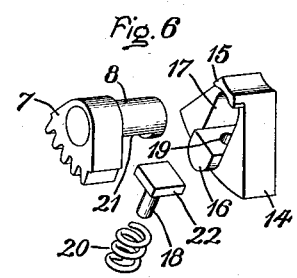
Inventor:
Hugh M. Stephenson,
by Harry E. Dunham
His Attorney.

Patented July 23, 1935

2,009,099

UNITED STATES PATENT OFFICE 2,009,099

VARIABLE SPEED TRANSMISSION

Hugh M. Stephenson, Fort Wayne, Ind., assignor to General Electric Company, a corporation of New York Application April 10, 1934, Serial No. 719,890

15 Claims. (Cl. 74—337)

My invention relates to variable speed transmissions.

An object of my invention is to provide a transmission in which the speed reduction is dependent upon the transmitted torque.

Another object of my invention is to provide an expansible gear in which the pitch diameter is varied in response to the torque transmitted by the gear.

Another object of my invention is to provide an expansible gear having a plurality of radially spaced toothed segments which are pivotally carried so that the segments may adapt themselves to a meshing gear.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which Fig. 1 is a side elevation partly broken away of a variable speed transmission embodying my invention; Fig. 2 is a sectional view taken on line 2—2 of Fig. 3; Fig. 3 is a sectional view taken on the line 3—3 of Fig. 2; Fig. 4 is an end elevation partly broken away of the expansible pitch gear at the position of maximum pitch diameter; Fig. 5 is an end elevation of the scroll and slotted disks which support the segments of the expansible gear, looking toward the reduced end of the drive shaft; and Fig. 6 is an exploded view of one of the gear segments of the expansible gear and the arrangement for pivotally mounting the segment.

The variable speed transmission which I have illustrated embodying my invention, is contained within a split casing 1 having bearings 2 and 3 therein in which the driving shaft 4 and the driven shaft 5 respectively rotate. The parts of the split casing are held together by bolts 6 which are threaded into bosses 6a on one part of the casing 1.

The driving shaft 4 is connected to an expansible pitch gear which comprises a plurality of radially-spaced gear segments 7. Each of the gear segments 7 is rigidly connected to a pin 8, the end 8a of which fits within a curved slot 11 in the scroll disk 9, and the portion 8b of which fits in a straight slot 12 in the slotted disk 10, as shown in Fig. 3. The slots 11 are curved in the direction of rotation of the driving shaft 4 which is indicated by arrows on Figs. 2 and 5. The slots 12 are radial, and it can be readily seen that relative rotation between the scroll disk 9 and slotted disk 10 will cause the gear segments 7 to be moved radially. The scroll disk 9 and the slotted disk 10 are connected by a helical spring 13 which has an initial tension biasing the scroll disk 9 in a counter-clockwise direction with respect to the disk 10, as viewed in Fig. 5. The normal position of the disks 9 and 10 is such that the gear segments 7 are at their maximum pitch diameter, as shown in Fig. 4.

The torque from the driving shaft 4 is transmitted from the scroll disk 9 which is fixed to the drive shaft 4, to the slotted disk 10 through the helical spring 13, and acts in a direction to overcome the initial tension of spring 13. The driving torque, which is dependent upon the torque load on the driven shaft 5, can therefore be utilized to cause the scroll disk 9 to rotate in a clockwise direction with respect to the slotted disk 10, as viewed in Fig. 5. The driving torque will thus cause the gear segments 7 to be moved radially inward to decrease the pitch diameter of the expansible gear.

The gear segments 7 are guided radially within their range of movement by a segmental member 14 having integral parts 15 and 16 projecting within the radial slots 12 of scroll disk 10 and having an opening 17 therein through which the pin 8 projects. The projections 15 and 16 maintain the member 14 on a fixed radial axis corresponding to the axis of slots 12. In order to maintain the gear segments 7 centered on these radial axes, a pin 18, sliding in opening 19, is urged by spring 20 against a substantially flat surface 21 on the pin 8. The flat surface 22 of the pin 18 cooperates with the flat surface 21 on the pin 8, and normally holds each gear segment 7 centered. However, this arrangement permits the gear segments 7 to deviate from this axis by pivotal movement when necessary so that the gear segments 7 may mesh with another gear, and this pivotal movement is resisted by the spring 20. By this mounting arrangement of the gear segments 7, it is possible to have a continuous variation in the pitch diameter of the expansible gear, which is made up of gear segments 7, and maintain the gear segments 7 in continuous mesh with another gear. It will be understood that the surfaces 21 and 22 may be slightly curved if necessary to obtain smooth operation of the gear segments 7.

The expansible gear meshes with an internal ring gear 23 which is fixed to a transversely movable counter shaft 24. The counter shaft 24 is journaled in the end 26 of crank 25, and the other end of crank 25 is pivotally carried on a shaft 27 which is fixed in the casing 1. A helical spring 28, one end of which is fastened to the fixed shaft 27 and the other end of which is fastened to the crank 25, urges the crank 25 in a clockwise direction, as seen in Fig. 2, and thereby maintains the ring gear 23 in mesh with the expansible gear made up of gear segments 7. The tension of spring 28 is chosen so that the ring gear 23 is always maintained in mesh with the expansible gear.

In order to transmit torque from the counter shaft 24 to the driven shaft 5, the counter shaft 24 is connected to an expansible gear 29 of construction similar to the expansible gear connected to shaft 4, and this expansible gear meshes with an internal ring gear 30 fixed to the driven shaft 5. The only difference between the construction of the expansible gear 29 and the expansible gear connected to shaft 4 is in the spring constant of the spring 13a, which corresponds to the spring 13. The spring 13a is given an initial tension such that the disks 9 and 10 tend to force the gear segments 7 to a position of maximum pitch diameter. The spring constant of the spring 13a is preferably such that the torque exerted by the counter shaft 24 causes the same relative motion between the disks 9 and 10 of the expansible gear 29 that the torque exerted by the driving shaft 4 causes between the disks 9 and 10 of the expansible gear connected thereto. Since the torque exerted by the counter shaft 24 is equal to the torque exerted by the driving shaft 4 multiplied by the gear reduction between the expansible gear connected to the driving shaft 4 and the gear 23, spring 13a is stiffer than the spring 13. Except for this difference, the expansible gears are identical in construction, and the corresponding parts are indicated by the same reference numbers.

For the purpose of describing the operation of the variable speed transmission, first assume that no torque is being exerted by the driving shaft 4, and there is no torque on the driven shaft 5. Under this condition both expansible gears will be in the fully expanded position, as shown in Fig. 4, and the drive between each expansible gear and the corresponding ring gear will be at a 1-1 ratio. This condition will obtain until the torque exerted by the driving shaft 4 is sufficient to overcome the initial tension of spring 13.

When sufficient driving torque is exerted by the driving shaft 4 to overcome the initial tension of spring 13, spring 13 is deflected until the resisting force of spring 13 balances the driving torque, and this deflection allows disk 9 to move relative to disk 10 in a clockwise direction when the expansible gear is viewed, as in Fig. 5. This relative motion causes the gear segments 7 to be retracted radially in the slots 12 with the result that the diameter of the expansible gear is decreased. The spring 28 urges the ring gear 23 which meshes with the expansible gear in a clockwise direction when viewed as in Fig. 4, and keeps the expansible gear constantly in mesh with the ring gear 23. The torque exerted by the ring gear 23 upon the counter shaft 24 causes a similar reduction in the pitch diameter of the expansible gear 29, which is connected to the counter shaft 24, and the spring 28 keeps the expansible gear 29 continuously in mesh with the gear 30 connected to driven shaft 5. Under these conditions, torque is transmitted from the driving shaft 4 to the driven shaft 5 through two sets of reduction gears, each of which comprises an expansible gear and a ring gear.

When sufficient torque is applied to the drive shaft 4, the gear segments 7 of the expansible gears will be moved to the position of minimum pitch diameter, as shown in Fig. 2. In this position the sides of the gear segments 7 are in contact, and the segments form a complete circle. The sides of the members 14 are also in contact.

At certain intermediate radial positions of the segments 7, it is necessary that the teeth move circumferentially in order that the teeth of the segments may mesh with the teeth of the ring gear. This circumferential movement of the teeth of the gear segments 7 is permitted by a pivotal movement of each gear segment 7 about the pin 8 to which it is attached. This pivotal movement is resisted by the spring 20 which forces the flat surface 22 of the pin 18 against a flat surface on the pin 8 and tends to hold the gear segments 7 in a radial position hereinbefore described. With this arrangement, it is possible to provide an expansible pitch gear which can have a continuously variable pitch diameter and yet remain in continuous mesh with a gear of constant pitch diameter.

Although I have shown a particular embodiment of my invention, I do not desire to be limited to the construction described, and I intend in the appended claims to cover all modifications which do not depart from the spirit and scope of my invention.

What I claim as new and desire to secure by Letters Patent of the United States, is,—

1. A variable speed transmission comprising a driving and driven member, means including an expansible pitch gear for connecting said members, and means dependent upon the torque exerted by said driven member for varying the pitch diameter of said expansible gear.

2. A variable speed transmission comprising a driving and a driven member, an expansible pitch gear connected to said driving member, a gear meshing with said expansible gear, a transversely movable shaft carrying said meshing gear, means for maintaining said gears continuously in mesh, and means including an expansible gear for connecting said meshing gear with said driven member.

3. An expansible gear comprising a plurality of radially spaced gear segments, means including a scroll disk rotatably movable with respect to said gear segments for varying the radial position of said segments, and means for providing limited pivotal movement of said segments.

4. A variable speed transmission comprising a driving and a driven member each rotating about a fixed axis, an expansible pitch gear connected to said driving member and meshing with a movable gear, a transversely movable counter shaft carrying said meshing gear, and means including an expansible gear for transmitting torque from said counter shaft to said driven member.

5. A variable speed transmission comprising a driving and a driven member each rotatable about a fixed axis, a transversely movable counter shaft, means including an expansible pitch gear for connecting said driving member to said counter shaft, and means including an expansible gear for transmitting torque from said counter shaft to said driven member.

6. A variable speed transmission comprising a driving and a driven member, means including an expansible pitch gear for connecting said members, and means including a resilient connection between said driving member and said expansible pitch gear and dependent upon the torque resistance exerted on said expansible pitch gear for varying the pitch diameter of said expansible pitch gear.

7. A variable speed transmission comprising a driving member and a driven member, means including an expansible pitch gear for connecting said members, and means dependent upon the torque resistance exerted on said expansible pitch gear for varying the pitch diameter of said expansible pitch gear.

8. A variable speed transmission comprising a driving and a driven member, means including a segmental expansible pitch gear for connecting said members, means for guiding the movement of the segments of said expansible pitch gear, and means including a resilient connection between said guiding means and said driving member and dependent upon the resistance torque exerted on said expansible pitch gear for varying the pitch diameter of said expansible pitch gear.

9. A variable speed transmission comprising a driving member and a driven member, a segmental expansible pitch gear, means for radially guiding the segments of said expansible pitch gear, and means including a resilient connection between said driving member and said expansible pitch gear and dependent upon the torque resistance exerted on said expansible pitch gear for varying the pitch diameter of said expansible pitch gear.

10. A variable speed transmission comprising a driving member and a driven member, a segmental expansible pitch gear, means including a radially slotted disk for radially guiding the segments of said expansible pitch gear, a scroll disk rigidly connected to said driving member and having circumferentially extending curved slots each slidably connected to the segments of said expansible pitch gear, and means including a resilient connection between said scroll disk and said radially slotted disk and dependent upon the torque resistance exerted upon the expansible pitch gear for varying the pitch diameter of said expansible pitch gear.

11. A variable speed transmission comprising a driving member and a driven member, an expansible pitch gear carried by one of said members, a counter shaft, means for supporting said counter shaft movably with respect to said members, a gear carried by said counter shaft and engaging said expansible pitch gear carried by said one member, a gear on said other member, an expansible pitch gear carried by said counter shaft and engaging said gear on said other member, and means for retaining said expansible pitch gears in engagement with said gears.

12. A variable speed transmission comprising a driving member and a driven member, an expansible pitch gear carried by one of said members, a counter shaft, means for supporting said counter shaft movably with respect to said members, a gear carried by said counter shaft and engaging said expansible pitch gear carried by said one member, a gear on said other member, an expansible pitch gear carried by said counter shaft and engaging said gear on said other member, means for retaining said expansible pitch gears in engagement with said gears, and means dependent upon the torque resistance exerted on said expansible pitch gears for varying the pitch diameter of said expansible pitch gears.

13. A variable speed transmission comprising a driving and a driven member, an expansible pitch gear carried by said driving member, a counter shaft, means for supporting said counter shaft movably with respect to said driving and driven members, a gear carried by said counter shaft and engaging said expansible pitch gear carried by said driving member, a gear on said driven member, an expansible pitch gear carried by said counter shaft and engaging said gear on said driven member, and means for retaining said expansible pitch gears in engagement with said gears carried by said counter shaft and said driven member respectively.

14. A variable speed transmission comprising a driving and a driven member, an expansible pitch gear carried by said driving member, a counter shaft, means for supporting said counter shaft movably with respect to said driving and driven members, a gear carried by said counter shaft and engaging said expansible pitch gear carried by said driving member, a gear on said driven member, an expansible pitch gear carried by said counter shaft and engaging said gear on said driven member, means for retaining said expansible pitch gears in engagement with said gears carried by said counter shaft and said driven member respectively, and means dependent upon the torque resistance exerted on said expansible pitch gears for varying the pitch diameter of said expansible pitch gears.

15. A variable speed transmission comprising a driving member and a driven member, an expansible pitch gear carried by said driving member, a counter shaft, means for pivotally supporting said counter shaft movably with respect to said driving and driven members, a gear carried by said counter shaft and engaging said expansible pitch gear carried by said driving member, a gear on said driven member, an expansible pitch gear carried by said counter shaft and engaging said gear carried by said driven member, means for resiliently retaining said expansible pitch gear in engagement with said gears carried by said counter shaft and said driven member respectively, and means dependent upon the resistance torque exerted by said driven member for varying the pitch diameter of said expansible gears.

HUGH M. STEPHENSON.